April 24, 1962  R. E. ROBERSON ETAL  3,031,154
SATELLITE VEHICLE STRUCTURE
Filed Sept. 20, 1956  2 Sheets-Sheet 1

*INVENTORS.*
ROBERT E. ROBERSON
JOHN V. BREAKWELL
BY

ATTORNEY

April 24, 1962 R. E. ROBERSON ET AL 3,031,154
SATELLITE VEHICLE STRUCTURE
Filed Sept. 20, 1956 2 Sheets-Sheet 2

*INVENTORS.*
ROBERT E. ROBERSON
JOHN V. BREAKWELL
BY
*Lewis L. Humphries*
ATTORNEY

United States Patent Office 3,031,154
Patented Apr. 24, 1962

3,031,154
SATELLITE VEHICLE STRUCTURE
Robert E. Roberson, Fullerton, and John V. Breakwell, Long Beach, Calif., assignors to North American Aviation, Inc.
Filed Sept. 20, 1956, Ser. No. 611,813
2 Claims. (Cl. 244—1)

This invention relates to a particular structure for a satellite vehicle. More particularly, it relates to a satellite vehicle having two masses coupled together.

It has been determined that the earth's gravitational field can advantageously be used to maintain a satellite vehicle in alignment if the vehicle is constructed of two masses spaced apart and having their principal moments of inertia in a particular arrangement with respect to the path of the satellite vehicle and the gravitational field. By the particular structure, an inherent vertical stability is obtained which counteracts any persistent external torques which act to disturb the vertical attitude of the vehicle, and permit a control system to be designed without fear of its capabilities being exceeded by persistent torques.

As the vehicle moves in its orbit around the earth, for example, periodic oscillatory torques occur causing the vehicle to assume an oscillatory steady state condition. The purpose of this invention is to stabilize at least a portion of the satellite vehicle against the major oscillatory torques, leaving to the control system the task of removing transient and unpredictable or minor periodic torques. This invention consists of a stable attitude satellite vehicle broken into two parts. These parts are connected by a particular coupling device described hereinafter. One of the two masses of the device of the invention obtains stabilization at the expense of the other mass.

It is therefore an object of this invention to provide a satellite vehicle having improved stability characteristics.

It is another object of this invention to provide a satellite vehicle structure which is more easily stabilized by a control system.

It is another object of this invention to stabilize one portion of a satellite vehicle structure.

A still further object of this invention is to provide a satellite vehicle structure having one portion acting as a vibration absorber.

Still another object of this invention is to provide a satellite vehicle structure which requires a minimum of energy to stabilize the vehicle.

It is a still further object of this invention to provide a simple and more economical method of stabilizing a satellite vehicle structure.

Other objects of invention will become apparent from the following description taken in connection with the accompanying drawings, in which FIG. 1 is an illustration of a satellite in its orbit around the earth;

Figure 1:
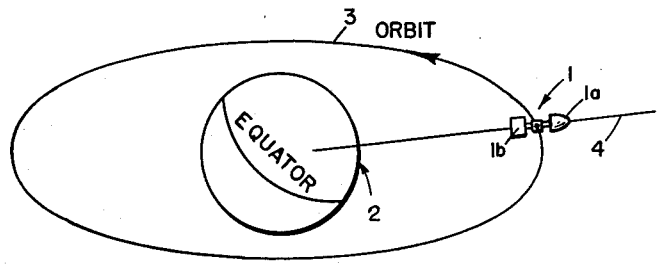

Referring now to FIG. 1, a satellite vehicle 1 travels around earth 2 in orbital path 3. The two masses of the satellite 1a and 1b tend to align themselves in a stable position which is along the vertical line 4 (passing through the earth's center). However, earth satellites travel in a slightly elliptical orbit rather than a perfectly circular orbit thus giving rise to periodic oscillatory torques on the satellite 1. These occur in the plane of the orbit. The torques cause a forced oscillation in the two parts of the vehicle. It can then be understood that an articulate structural coupling between the two portions can be utilized to increase or decrease the response by one part of the satellite to the oscillatory torques. This coupling, in one embodiment, is flexible or spring-like and, in another, like a hinge. In particular, if the coupling is suitably chosen, the part of the satellite nearer the earth can be made not to oscillate, the disturbing energy being concentrated in the motion of the upper, or outer, body. Any initial oscillation may be gradually damped out by friction in the coupling device or a damping system.

The condition for non-oscillation of the part nearer the earth is expressed in the following formula, which is applicable where the two masses are bodies of revolution:

$$\left(\mu a a^1 + \frac{K}{\omega^2}\right)\{I_0^1 + \mu a^1(a+a^1)\} + \{I_0 + \mu a(a+a^1)\}$$
$$\left\{2I_0^1 + \mu a^1(3a+2a^1) - 3I_\rho^1 + \frac{K}{\omega^2}\right\} = 0 \quad (1)$$

$$\mu = \frac{m m^1}{m + m^1}$$

Figure 5:
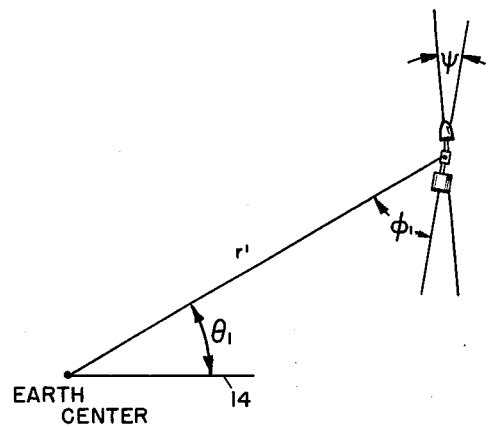
FIG. 5 illustrates various parameters of the satellite system.

$m$ = mass of the lower body
$m^1$ = mass of the upper body
$a$ = distance of the center of gravity of the lower body from the hinge joint, that is, from the place of articulation of the articulate coupling means
$a^1$ = distance of the center of gravity of the upper body from the hinge joint, that is, from the place of articulation of the articulate coupling means
$I_0^1$ = moment of inertia of the upper body about the axis through the center of gravity of the upper body and parallel to the bending axis of the hinge, that is, the axis at which the articulate coupling means articulates
$I_\rho^1$ = moment of inertia of the upper body about its respective axis of symmetry
$I_0$ = moment of inertia of the lower body about the axis through the center of gravity of the lower body and parallel to the bending axis of the hinge, that is, the axis at which the articulate coupling means articulates
$\omega$ = average orbital angular velocity, and
$K$ = the spring constant of the coupling between the two masses, i.e., $K\psi$ is the restoration couple tending to reduce the size of $\psi$ (see FIG. 5).

Proper design of moments of inertia and lengths provide a particular "dynamically balanced" situation in which no restorative coupling is required to eliminate the oscillation of the lower half. In other words, the coupling device need only be a free hinge as distinguished from a spring.

The condition for the "dynamically balanced" satellite (for which the lower mass will be stabilized and the upper mass will assume all the oscillatory motion) is expressed in the following formula:

$$\mu a a^1 [I_0^1 + \mu(a+a^1)a^1] + [2I_0^1 + \mu(3a+2a^1)a^1 - 3I_\rho^1][I_0 + \mu a(a+a^1)] = 0 \quad (2)$$

Figure 2:
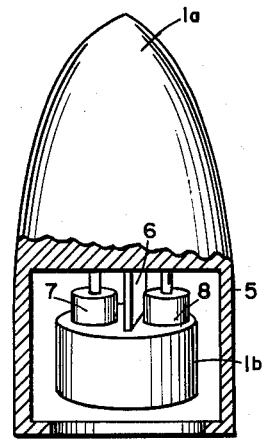
FIG. 2 is an illustration of an alternate satellite structure showing a flexible spring coupling between the two masses of the satellite structure and rate damping means.

FIG. 2 illustrates a satellite vehicle structure composed of mass 1a and mass 1b contained within an external skin 5. A flexible leaf spring 6 connects the masses together. Rate dampers, such as viscous hydraulic dampers 7 and 8 provide damping, together with spring 6 to remove oscillation between masses 1a and 1b. Dampers 7 and 8 may be adjusted to control the same or different frequencies.

Figure 3:
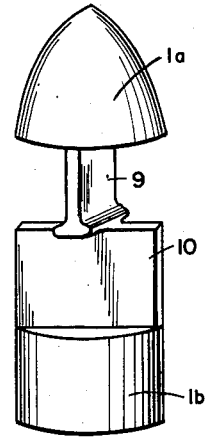
FIG. 3 is another embodiment illustrating orthogonal leaf spring coupling between two masses of a satellite vehicle.

FIG. 3 illustrates another coupling between masses 1a and $1b$ comprised of orthogonal leaf springs 9 and 10, which may be constructed to have different spring rates to meet different periodic torques in different planes. If roll and pitch excitation torques occur at different frequencies, the device of FIG. 3 may be especially suitable. Certain periodic roll torques will, in general, be caused by the oblate shape of the earth.

It is desirable in a device as described herein that the coupling members are restrained by additional rigid members (not shown) until the vehicle reaches its orbital path and commences orbital flight.

Figure 4:
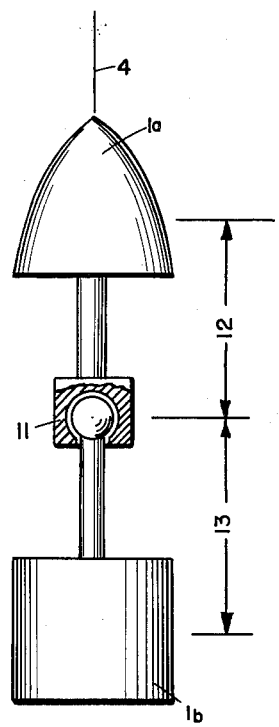
FIG. 4 is an illustration of a satellite vehicle structure showing a ball and socket coupling between two masses.

The illustration of FIG. 4 shows the two masses $1a$ and $1b$ having their least principal moment of inertia about line 4, which lies along the vertical gravitational axis. The coupling member 11 is illustrated as being a ball and socket type joint. This is for illustration only and it is to be understood that this joint may be any kind of free hinge in the case of the "dynamically balanced" satellite mentioned above.

The coupling of FIG. 4 may be used in conjunction with the dampers of FIG. 2.

Formula 1 was obtained from an analysis of the mechanics of a satellite comprised of two bodies of revolution hinged together at a point on both their axes of revolution. Such bodies are illustrated in FIGS. 2, 3 or 4.

The kinetic energy of a satellite, $T$, is derived from FIG. 5 as follows:

$$T = \frac{1}{2} m [\dot{r}_1^2 + r_1^2 \dot{\theta}_1^2 + 2\dot{r}_1 a (\dot{\phi}_1 + \dot{\theta}_1) \sin \phi_1$$
$$- 2 r_1 \dot{\theta}_1 a (\dot{\phi}_1 + \dot{\theta}_1) \cos \phi_1 ] + \frac{1}{2} I (\dot{\phi}_1 + \dot{\theta}_1)^2$$
$$+ \frac{1}{2} m^1 [\dot{r}_1^2 + r_1^2 \dot{\theta}_1^2 - 2 \dot{r}_1 a^1 (\dot{\phi}_1 + \dot{\theta}_1 + \dot{\psi}) \sin (\phi_1 + \psi)$$
$$+ 2 r_1 \dot{\theta}_1 a^1 (\dot{\phi}_1 + \dot{\theta}_1 + \dot{\psi}) \cos (\phi_1 + \psi) ] + \frac{1}{2} I^1 (\dot{\phi}_1 + \dot{\theta}_1 + \dot{\psi})^2 \quad (3)$$

where $I$ is the moment of inertia of the lower body about the hinge, $I^1$ is the moment of inertia of the upper body about the hinge, and other terms are defined as illustrated in FIG. 5.

The potential energy, $V$, when the earth is treated as spherical, is as follows:

$$V = -\frac{\gamma M (m + m^1)}{r_1} - \frac{\gamma m}{r_1^2} [ma \cos \phi_1 - m^1 a^1 \cos (\phi_1 + \psi)]$$
$$- \frac{\gamma M}{2 r_1^3} \{ (I - I_\rho)(3 \cos^2 \phi_1 - 1)$$
$$+ (I^1 - I_\rho)[3 \cos^2 (\phi_1 + \psi) - 1] \} + o(r_1^{-4}) \quad (4)$$

where $I_\rho$ is the moment of inertia of the upper mass about its vertical axis,
$M$ is the mass of the earth,
$\gamma$ is the gravitational constant,
$o(\ )$ represents various terms of the order of $(\ )$, which may be neglected, and
$\theta_1$ is measured from an arbitrary reference line 14 located in the plane of the orbit.

Figure 6:
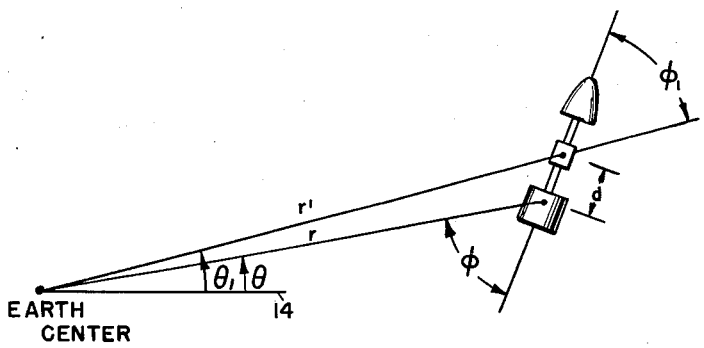
FIG. 6 illustrates other parameters of the satellite system.

Introducing the coordinates $r, \theta, \phi$, of FIG. 6 in place of $r_1, \theta_1, \phi_1$, measured, again, from an arbitrary reference line 14 in the plane of orbit, and writing the LaGrange equations corresponding to $\phi$ and $\psi$, and retaining only terms linear in $\phi$ and $\psi$, we obtain:

$$[I + I^1 - (m + m^1) d^2] \ddot{\phi} + [I^1 + m^1 a^1 d] \ddot{\psi}$$
$$+ \frac{3 \gamma M}{r^3} [I + I^1 - (m + m^1) d^2 - I_\rho - I_\rho^1] \phi$$
$$+ \frac{3 \gamma M}{r^3} (m^1 a^1 d + I^1 - I_\rho^1) \psi = -[I + I^1 - (m + m^1) d^2] \ddot{\theta} \quad (5)$$

where $$d = \frac{ma - m^1 a^1}{m + m^1} \quad (6)$$

and $$(I^1 + m^1 a^1 d) + \ddot{\phi}) + \left[ I^1 - \frac{m^{1^2} a^{1^2}}{m + m^1} \right] \ddot{\psi} + \frac{m^{1^2} a^{1^2}}{m + m^1} \left( \frac{\dot{r}}{r} \dot{\psi} + \frac{\ddot{r}}{r} \psi \right)$$
$$+ m^1 a^1 d \dot{\theta}^2 \psi + \frac{3 \gamma M}{r^3} [I^1 + m^1 a^1 d - I_\rho^1] \psi + \frac{3 \gamma M}{r^3} (I^1 - I_\rho^1) \psi$$
$$+ \frac{2 \gamma M m^1 a^1 d}{r^3} \psi + G = -(I^1 + m^1 a^1 d) \ddot{\theta} \quad (7)$$

where $G$ is the restoring torque at the hinge.

Substituting the following formulas, valid for almost circular orbits:

$$r = \left( \frac{\gamma M}{\omega^2} \right) y_3 + o(\epsilon) \quad (8)$$

and $$\ddot{\theta} = -2 \epsilon \omega^2 r \sin \omega t + o(\epsilon^2) \quad (9)$$

Where $\epsilon$ is the (small) orbital eccentricity and $t$ is the time measured from the instant when the satellite is nearest to the earth, and assuming that the restoring torque $G$ is proportional to the bend angle $\psi$:

$$G = K \psi$$

we find that the forced response $\phi$ of the lower body to the resulting disturbance of angular frequency $\omega$ is exactly zero provided that Formula 1 is satisfied.

It has been determined that design according to Equation 1 will provide the desired stability in the mass closest to the earth, which is the concept of this invention. If Equation 2 is satisfied, (by a suitable choice of the masses and the dimensions involved) the free hinge, such as the ball and socket joint of FIG. 4, is appropriate. A small amount of friction in the coupling joint will eventually eliminate any initial oscillation of the lower mass.

If the conditions of Equations 1 and 2 are only approximated, the lower mass will be caused to oscillate with a small amplitude, in addition to oscillations transmitted by reason of friction in the coupling between the masses. This may be dissipated by a damper such as the viscous dampers of FIG. 2. Too much friction, or damping, between the two masses will give rise to an appreciable undesired oscillation of the lower mass out of phase with the disturbing torque.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for stabilizing a satellite vehicle wherein said vehicle orbits around a celestial body at a speed sufficient to create a centrifugal force substantially equal to the gravitational pull between said vehicle and said celestial body, said means including a first mass consisting of an upper body portion of said vehicle, a second mass consisting of a lower body portion of said vehicle, and articulate structure means connecting one of said masses to the other, wherein said masses are bodies of revolution being symmetrical about respective axes, wherein said articulate structure means includes spring means, and wherein said masses, the distances of the center of gravity of said masses from the place of articulation of said articulate coupling means, and the moments of inertia of said masses are as follows:

$$\left( \mu a a^1 + \frac{K}{\omega^2} \right) [I_0^1 + \mu a^1 (a + a^1)]$$
$$+ [I_0 + \mu a (a + a^1)] \left[ 2 I_0^1 + \mu a^1 (3a + 2a^1) - 3 I_\rho^1 + \frac{K}{\omega^2} \right] = 0$$

wherein the terms are defined as follows:

$$\mu = \frac{mm^1}{m+m^1}$$

$m$ = mass of the lower body
$m^1$ = mass of the upper body
$a$ = distance of the center of gravity of the lower body from the place of articulation of the articulate coupling means
$a^1$ = distance of the center of gravity of the upper body from the place of articulation of the articulate coupling means
$K$ = the spring constant of the coupling between the two masses, i.e., $K\psi$ is the restoration couple tending to reduce the size of an angle $\psi$.
$\omega$ = average orbital angular velocity
$I_0^1$ = moment of inertia of the upper body about the axis through the center of gravity of the upper body and parallel to the axis at which the coupling means articulates.
$I_0$ = moment of inertia of the lower body about the axis through the center of gravity of the lower body and parallel to the axis at which the coupling means articulates
$I_p^1$ = moment of inertia of the upper body about its respective axis of symmetry.

2. A satellite vehicle wherein said vehicle orbits around a celestial body at a speed sufficient to create a centrifugal force substantially equal to the gravitational pull between said vehicle and said celestial body, said vehicle including a first mass comprising an upper body portion of said vehicle and a second mass comprising a lower body portion of said vehicle, and articulate structure means connecting one of said masses to the other, wherein said masses comprise bodies of revolution, said articulate structure means including spring means and wherein further said masses, the distance of the center of gravity of said masses from said articulate structure coupling means, and the moments of inertia of said masses are as follows:

$$\left(\mu a a^1 + \frac{K}{\omega^2}\right)[I_0^1 + \mu a^1(a+a^1)]$$
$$+[I_0 + \mu a(a+a^1)]\left[2I_0^1 + \mu a^1(3a+2a^1) - 3I_p^1 + \frac{K}{\omega^2}\right] = 0$$

wherein the terms are defined as follows:

$$\mu = \frac{mm^1}{m+m^1}$$

$m$ = mass of the lower body
$m^1$ = mass of the upper body
$a$ = distance of the center of gravity of the lower body from the place of articulation of the articulate coupling means
$a^1$ = distance of the center of gravity of the upper body from the place of articulation of the articulate coupling means
$K$ = the spring constant of the coupling between the two masses, i.e., $K\psi$ is the restoration couple tending to reduce the size of an angle $\psi$.
$\omega$ = average orbital angular velocity
$I_0^1$ = moment of inertia of the upper body about the axis through the center of gravity of the upper body and parallel to the axis at which the coupling means articulates
$I_0$ = moment of inertia of the lower body about the axis through the center of gravity of the lower body and parallel to the axis at which the coupling means articulates
$I_p^1$ = moment of inertia of the upper body about its respective axis of symmetry.

References Cited in the file of this patent

UNITED STATES PATENTS

| | | |
|---|---|---|
| 35,734 | Gault | June 24, 1862 |
| 1,343,747 | Radakovich | June 15, 1920 |
| 1,464,192 | Willson | Aug. 7, 1923 |

FOREIGN PATENTS

| | | |
|---|---|---|
| 496,913 | France | Aug. 22, 1919 |